United States Patent
Oda et al.

(10) Patent No.: US 9,431,730 B2
(45) Date of Patent: Aug. 30, 2016

(54) MOUNTING STRUCTURE FOR CONNECTION TERMINAL, TURBO COMPRESSOR, AND TURBO REFRIGERATOR

(71) Applicant: IHI Corporation, Tokyo (JP)

(72) Inventors: Kentarou Oda, Tokyo (JP); Nobuyoshi Sakuma, Tokyo (JP)

(73) Assignee: DAIKIN INDUSTRIES, LTD. (JP)

( * ) Notice: Subject to any disclaimer, the term of this patent is extended or adjusted under 35 U.S.C. 154(b) by 0 days.

(21) Appl. No.: 14/626,310

(22) Filed: Feb. 19, 2015

(65) Prior Publication Data

US 2015/0162676 A1 Jun. 11, 2015

Related U.S. Application Data

(63) Continuation of application No. PCT/JP2013/070182, filed on Jul. 25, 2013.

(30) Foreign Application Priority Data

Aug. 27, 2012 (JP) ................................. 2012-186439

(51) Int. Cl.
*H01R 13/73* (2006.01)
*H01R 9/16* (2006.01)
(Continued)

(52) U.S. Cl.
CPC .............. *H01R 9/16* (2013.01); *F04D 13/0693* (2013.01); *F04D 17/12* (2013.01); *F04D 25/0693* (2013.01); *F04D 25/163* (2013.01); *F25B 1/053* (2013.01); *H01R 9/18* (2013.01); *H02K 5/225* (2013.01); *F25B 1/10* (2013.01); *F25B 25/005* (2013.01); *F25B 31/026* (2013.01);
(Continued)

(58) Field of Classification Search
CPC ...................................................... H01R 13/748
USPC .......................... 439/464, 564, 908; 174/151
See application file for complete search history.

(56) References Cited

U.S. PATENT DOCUMENTS

| | | | | |
|---|---|---|---|---|
| 1,526,023 A | * | 2/1925 | Steinberger | H01B 17/28 174/142 |
| 2,418,729 A | * | 4/1947 | Schemers | H01B 17/306 174/153 R |

(Continued)

FOREIGN PATENT DOCUMENTS

| | | |
|---|---|---|
| JP | 58-041046 | 3/1983 |
| JP | 06-058560 | 8/1994 |

(Continued)

OTHER PUBLICATIONS

International Search Report and Written Opinion mailed Sep. 24, 2013 in corresponding PCT International Application No. PCT/JP2013/070182.

*Primary Examiner* — Neil Abrams
(74) *Attorney, Agent, or Firm* — Ostrolenk Faber LLP

(57) ABSTRACT

A mounting structure for a main terminal for mounting the main terminal to a housing in the state of one end portion to which a lead wire can be affixed being inserted into the housing, and the other end portion being exposed to the outside of the housing, in which the housing has a mounting hole for inserting and extracting the one end portion together with the lead wire; and the main terminal has a flange portion that can mount the main terminal about the mounting hole from the outside of the housing without involving rotation of the main terminal.

9 Claims, 10 Drawing Sheets

(51) Int. Cl.
*H01R 9/18* (2006.01)
*H02K 5/22* (2006.01)
*F04D 13/06* (2006.01)
*F25B 1/053* (2006.01)
*F04D 17/12* (2006.01)
*F04D 25/06* (2006.01)
*F04D 25/16* (2006.01)
*F25B 31/02* (2006.01)
*F25B 1/10* (2006.01)
*F25B 25/00* (2006.01)

(52) U.S. Cl.
CPC .. *F25B2339/047* (2013.01); *F25B 2341/0662* (2013.01); *F25B 2400/077* (2013.01); *F25B 2400/13* (2013.01); *F25B 2400/23* (2013.01)

(56) References Cited

U.S. PATENT DOCUMENTS

| | | | | | |
|---|---|---|---|---|---|
| 2,438,572 | A * | 3/1948 | McCormack | | H01B 17/306 174/153 R |
| 2,742,624 | A * | 4/1956 | Stevens, Jr. | | H01R 13/631 174/153 R |
| 2,997,530 | A * | 8/1961 | Rosan | | H01B 17/306 174/153 R |
| 3,321,733 | A * | 5/1967 | Thomas | | H01R 13/53 439/271 |
| 3,696,321 | A * | 10/1972 | Cooper, Jr. | | H01R 9/00 174/152 R |
| 3,708,612 | A * | 1/1973 | Saxon | | H01B 17/306 174/142 |
| 3,850,501 | A * | 11/1974 | Butterfield | | H01B 17/58 439/196 |
| 4,486,058 | A * | 12/1984 | Takagi | | H01R 9/16 439/544 |
| 4,800,732 | A * | 1/1989 | Newton | | F25B 31/02 310/71 |
| 5,110,307 | A * | 5/1992 | Rapoza | | C04B 37/026 174/152 GM |
| 5,227,587 | A * | 7/1993 | Paterek | | H01B 17/305 174/151 |
| 5,308,925 | A * | 5/1994 | Paterek | | H01B 17/305 174/151 |
| 5,342,998 | A * | 8/1994 | Nolte | | H01B 17/26 174/142 |
| 5,417,587 | A * | 5/1995 | Katsuda | | H01R 4/64 439/559 |
| 6,155,875 | A * | 12/2000 | Ineson | | H01R 9/18 439/564 |
| 6,328,579 | B1 | 12/2001 | Mori et al. | | |
| 6,450,842 | B1 * | 9/2002 | Matsuda | | H01R 13/415 439/431 |
| 6,709,287 | B2 * | 3/2004 | Sims | | B60L 11/1816 200/296 |
| 6,910,904 | B2 * | 6/2005 | Herrick | | F04B 39/121 439/271 |
| 7,059,839 | B2 * | 6/2006 | Haller | | F01C 21/10 184/6.16 |
| 7,652,212 | B2 * | 1/2010 | Stacy | | H01B 19/04 174/152 R |
| 7,854,636 | B2 * | 12/2010 | Gilliam | | H01R 13/622 174/152 R |
| 8,039,751 | B2 * | 10/2011 | Tsuboi | | H02K 3/46 174/151 |
| 8,794,999 | B2 * | 8/2014 | Schuckmann | | H01R 13/44 439/587 |
| 2011/0117773 | A1 * | 5/2011 | Delmas | | H01R 11/12 439/544 |
| 2011/0239694 | A1 | 10/2011 | Sugitani et al. | | 62/498 |
| 2015/0162676 | A1 * | 6/2015 | Oda | | H01R 9/18 62/498 |

FOREIGN PATENT DOCUMENTS

JP   2007-166822   6/2007
JP   2010-268622   11/2010
JP   2011-223679   11/2011

* cited by examiner

MOUNTING STRUCTURE FOR CONNECTION TERMINAL, TURBO COMPRESSOR, AND TURBO REFRIGERATOR

This application is a Continuation of International Application No. PCT/JP2013/070182, filed on Jul. 25, 2013, claiming priority based on Japanese Patent Application No. 2012-186439, filed on Aug. 27, 2012, the contents of both International Application and the Japanese Application being incorporated herein by reference in their entirety.

TECHNICAL FIELD

The present invention relates to a mounting structure for a connection terminal, a turbo compressor, and a turbo refrigerator.

BACKGROUND ART

Turbo refrigerators are known that are provided with a turbo compressor that rotates an impeller with an electric motor to compress and eject a refrigerant. There are various types of drive types of electric motors used in turbo compressors. For example, in an electric motor that generates a rotating magnetic field by three-phase currents, main terminals (connection terminals), that are electrically connected via lead wires to a plurality of coils that generate the rotating magnetic field, are mounted to the housing.

The below-mentioned Patent Document 1 discloses a motor and a compressor provided with the same in which the second ends of a plurality of electric wires, whose first ends are connected to a motor stator in a motor casing, are connected to terminal rods, and the terminal rods are exposed to the outside of the motor casing via terminal blocks attached to the motor casing. The mounting structure for the connection terminal of this motor is constituted such that the flange portion of the terminal rod is engaged with the terminal block in the interior of the motor casing, and a nut is fastened on a bolt portion of the terminal rod on the outside of the motor casing.

PRIOR ART DOCUMENTS

Patent Documents

[Patent Document 1] Japanese Unexamined Patent Application, First Publication No. 2010-268622

DISCLOSURE OF THE INVENTION

Problems to be Solved by the Invention

Conventionally, in the case of even one of the connection terminals exposed to the outside of the housing, such as the motor main terminals, being damaged, the heavy motor end cover is removed, the nut inside is loosened, and the damaged connection terminal is replaced. Among motors with the conventional technology outlined above, since a compact rotor is cantilevered (refer to FIG. 1 of Patent Document 1), it is possible to easily remove the motor end cover (terminal block).

However, in the case of for example a large motor, it is necessary to hold both ends of the rotor with bearings. For that reason, just to replace a damaged connection terminal, a large-scale disassembly operation that involves once taking apart the entire motor is sometimes required. In this kind of large-scale disassembly operation, a crane or the like is required since each component is large and heavy, so the operation may be troublesome and time consuming.

The present invention is achieved in view of the above circumstances, and has as its object to provide a mounting structure for a connection terminal that enables replacement of a connection terminal to be easily performed, and turbo compressor and a turbo refrigerator provided with the mounting structure for a connection terminal.

Means for Solving the Problems

The first aspect of the present invention is a mounting structure for a connection terminal that mounts a connection terminal to a housing in the state of one end portion to which a lead wire can be affixed being inserted into the housing, and the other end portion being exposed to the outside of the housing, in which the housing has a mounting hole for inserting and extracting the one end portion together with the lead wire; and the connection terminal has a flange portion that can mount the connection terminal about the mounting hole from the outside of the housing without involving rotation of the connection terminal.

In the first aspect of the present invention, by the easy work of just removing the flange portion, it is possible to pull out the one end portion of the connection terminal to which the lead wire is affixed from the mounting hole to the outside of the housing, and it is possible to release the fixation of the lead wire at a position that is visible, and independently replace the connection terminal.

In the second aspect of the present invention, the first aspect has an orientation adjusting member that adjusts the orientation of the connection terminal with respect to the mounting hole to a predetermined orientation.

In the second aspect of the present invention, by adjusting the orientation of the connection terminal with respect to the mounting hole so as to be constant, it is possible to adjust to a specified orientation the orientation of the lead wire that is affixed to the one end portion of the connection terminal and it is possible to sufficiently secure the insulation distance of the lead wires in the interior of the housing that is not visible.

In the third aspect of the present invention, the orientation adjusting member in the second aspect has a mark that is formed on the flange portion corresponding to the orientation in which the lead wire is affixed to the one end portion.

In the third aspect, since the mark is added corresponding to the orientation of the lead wire to the flange portion which is arranged on the outer portion of the housing that is visible, by adjusting the orientation based on this mark, it is possible to sufficiently secure the insulation distance of the lead wires in the interior of the housing that is not visible.

In the fourth aspect of the present invention, the orientation adjusting member in the second or third aspect has a fixing member that is provided in a non-equal interval in the circumferential direction of the flange portion.

In the fourth aspect of the present invention, since the flange portion can be affixed only in a specified orientation, it is possible to adjust the orientation of the lead wire that is affixed to the one end portion of the connection terminal and arranged in the interior of the housing to a specified orientation, and it is possible to sufficiently secure the insulation distance of the lead wires in the interior of the housing that is not visible.

In the fifth aspect of the present invention, the mounting hole in any of the first to fourth aspects has an oblong shape.

In the fifth aspect of the present invention, by tilting the connection terminal to which the lead wire is connected, it is possible to easily pull it out to the outside of the housing from the oblong-shaped mounting hole.

In the sixth aspect of the present invention, the lead wire in any of the first to fifth aspects has slack for being pulled out from the mounting hole.

In the sixth aspect of the present invention, since the lead wire is housed in the interior of the housing with a certain amount of slack, by pulling out the lead wire to a position at which it is visible and a position that facilitates work, it is possible to facilitate replacement of the connection terminal.

The seventh aspect of the present invention is a turbo compressor that compresses a gas by rotating an impeller with an electric motor, having as a mounting structure for a connection terminal of the electric motor the mounting structure for a connection terminal according to any one of the first to sixth aspects.

The eighth aspect of the present invention is a turbo refrigerator that has a condenser that liquefies a compressed refrigerant; an evaporator that by evaporating the refrigerant that is liquefied by the condenser cools a cooling object; and a turbo compressor that compresses the refrigerant that is evaporated by the evaporator and supplies it to the condenser, having as the turbo compressor the turbo compressor of the seventh aspect.

Effects of the Invention

According to the present invention, a mounting structure for a connection terminal that enables replacement of the connection terminal to be easily performed, and a turbo compressor and a turbo refrigerator provided with the mounting structure for a connection terminal are obtained.

EMBODIMENTS FOR CARRYING OUT THE INVENTION

Hereinbelow, embodiments of the present invention shall be described with reference to the drawings.

First Embodiment

Figure 1:
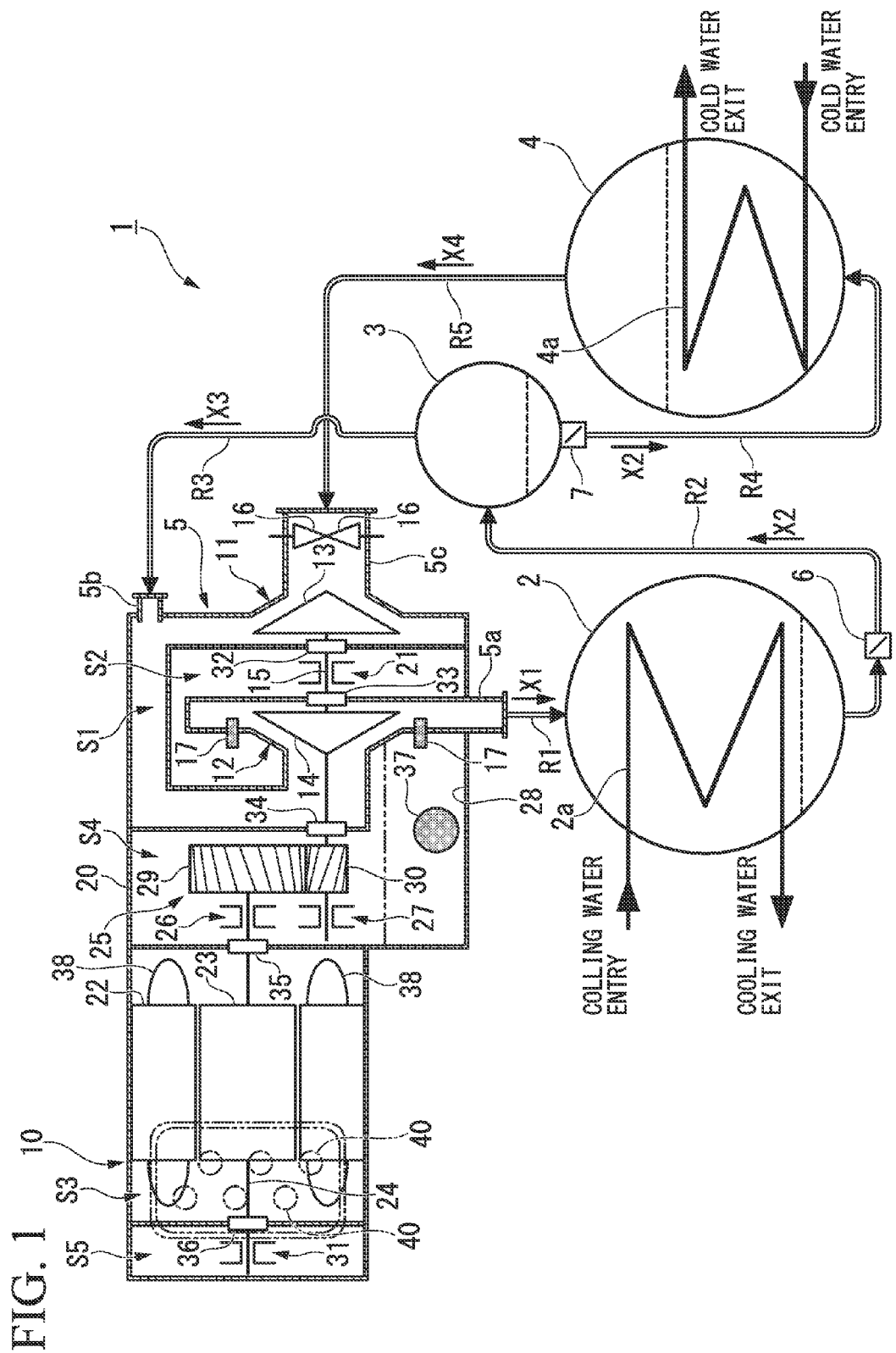
FIG. 1 is a system diagram of the turbo refrigerator in the first embodiment of the present invention.

FIG. 1 is a system diagram of a turbo refrigerator 1 in the first embodiment of the present invention.

The turbo refrigerator 1 of the present embodiment has cold water for air conditioning as the object to be cooled, with for example Freon serving as the refrigerant. As shown in FIG. 1, the turbo refrigerator 1 is provided with a condenser 2, an economizer 3, an evaporator 4, and a turbo compressor 5.

The condenser 2 is connected with a gas discharge tube 5a of the turbo compressor 5 via a flow passage R1. The refrigerant that is compressed by the turbo compressor 5 (the compressed refrigerant gas X1) is supplied to the condenser 2 along the flow passage R1. The condenser 2 liquefies this compressed refrigerant gas X1. The condenser 2 is provided with a heat transfer tube 2a through which cooling water circulates, and cools the compressed refrigerant gas X1 by heat exchange between the compressed refrigerant gas X1 and the cooling water.

The compressed refrigerant gas X1 is cooled by the heat exchange with the cooling water, liquefies to become a refrigerant liquid X2, and collects at the bottom of the condenser 2. The bottom of the condenser 2 is connected with an economizer 3 via the flow passage R2. An expansion valve 6 for decompressing the refrigerant liquid X2 is provided in the flow passage R2. The refrigerant liquid X2 that is decompressed by the expansion valve 6 is supplied to the economizer 3 through the flow passage R2. The economizer 3 stores the decompressed refrigerant liquid X2 temporarily, and separates the refrigerant into a liquid phase and a gas phase.

The top portion of the economizer 3 is connected with an economizer connecting tube 5b of the turbo compressor 5 via a flow passage R3. The gas phase component X3 of the refrigerant separated by the economizer 3 is supplied through the flow passage R3 to a second compression stage 12 in the turbo compressor 5 without passing through the evaporator 4 and a first compression stage 11, and enhances efficiency. On the other hand, the bottom portion of the economizer 3 is connected with the evaporator 4 via a flow passage R4. An expansion valve 7 for further decompressing the refrigerant liquid X2 is provided in the flow passage R4.

The refrigerant liquid X2 that is decompressed further by the expansion valve 7 is supplied to the evaporator 4 through the flow passage R4. By evaporating the refrigerant liquid X2, the evaporator 4 cools cold water with the evaporation heat. The evaporator 4 is provided with a heat-transfer tube 4a through which the cold water circulates, and cools the cold water and evaporates the refrigerant liquid X2 by the heat exchange between the refrigerant liquid X2 and the cold water. By the heat exchange with the cold water, the refrigerant liquid X2 draws heat, evaporates, and becomes refrigerant gas X4.

The top portion of the evaporator 4 is connected with a gas induction tube 5c of the turbo compressor 5 via a flow passage R5. The refrigerant gas X4 which is evaporated in the evaporator 4 is supplied to the turbo compressor 5 through the flow passage R5. The turbo compressor 5 compresses the refrigerant gas X4 which is evaporated, and supplies it to the condenser 2 as compressed refrigerant gas X1. The turbo compressor 5 is a two-stage compressor that is provided with a first compression stage 11 that compresses the refrigerant gas X4, and a second compression stage 12 that further compresses the refrigerant that is subjected to one stage of compression.

An impeller 13 is provided in the first compression stage 11, an impeller 14 is provided in the second compression stage 12, and they are connected by a rotation shaft 15. The turbo compressor 5 compresses the refrigerant by rotating the impellers 13 and 14 with an electric motor 10. The impellers 13 and 14 are radial impellers and have blades with three-dimensional torsion, not illustrated, that discharge in the radial direction refrigerant suctioned in the axial direction.

An inlet guide vane 16 for adjusting the suction quantity of the first compression stage 11 is provided in the gas induction tube 5c. The inlet guide vane 16 is made rotatable so that the apparent area from the flow direction of the refrigerant gas X4 can be changed. A diffuser flow passage is provided around each of the impellers 13 and 14, and the refrigerant that is ejected in the radial direction is compressed and raised in pressure in these flow passages. Moreover, it is possible to supply the refrigerant to the next compression stage by a scroll flow passage that is provided around the impellers 13 and 14. An outlet throttle valve 17 is provided around the impeller 14, whereby it is possible to control the discharge amount from the gas discharge tube 5a.

The turbo compressor 5 is equipped with an enclosed-type housing 20. The housing 20 is divided into a compression flow passage space S1, a first bearing accommodation space S2, a motor accommodation space S3, a gear unit accommodation space S4, and a second bearing accommodation space S5. The impellers 13 and 14 are provided in the compression flow passage space S1. The rotation shaft 15 which connects the impellers 13 and 14 is provided inserted in the compression flow passage space S1, the first bearing accommodation space S2, and the gear unit accommodation space S4. A bearing 21 that supports the rotation shaft 15 is provided in the first bearing accommodation space S2.

A stator 22, a rotor 23, and a rotation shaft 24 connected to the rotor 23 are provided in the motor accommodation space S3. This rotation shaft 24 is provided inserted in the motor accommodation space S3, the gear unit accommodation space S4, and the second bearing accommodation space S5. A bearing 31 that supports the anti-load side of the rotation shaft 24 is provided in the second bearing accommodation space S5. A gear unit 25, bearings 26 and 27, and an oil reservoir 28 are provided in the gear unit accommodation space S4.

A gear unit 25 has a large diameter gear 29 affixed to the rotation shaft 24, and a small diameter gear 30 that is affixed to the rotation shaft 15 and meshes with the large diameter gear 29. The gear unit 25 transmits rotating force so that the rotation frequency of the rotation shaft 15 may increase (become faster) with respect to the rotation frequency of the rotation shaft 24. The bearing 26 supports the rotation shaft 24. The bearing 27 supports the rotation shaft 15. The oil reservoir 28 stores the lubricating oil supplied to each sliding part of the bearings 21, 26, and 27 and 31 and the like. Note that the reference numeral 37 denotes an oil pump that supplies the lubricating oil to each sliding part.

In this kind of housing 20, seal portions 32 and 33 that seal the periphery of the rotation shaft 15 are provided between the compression flow passage space S1 and the first bearing accommodation space S2. Moreover, in the housing 20, a seal portion 34 that seals the periphery of the rotation shaft 15 is provided between the compression flow passage space S1 and the gear unit accommodation space S4. Also, in the housing 20, a seal portion 35 that seals the periphery of the rotation shaft 24 is provided between the gear unit accommodation space S4 and the motor accommodation space S3. Also, in the housing 20, a seal portion 36 that seals the periphery of the rotation shaft 24 is provided between the motor accommodation space S3 and the second bearing accommodation space S5.

Here, a plurality of main terminals (connection terminals) 40 for supplying alternating current from outside to a plurality of coils 38 of a stator 22 that is housed in a closed-type container are mounted to the housing 20.

Hereinbelow, the constitution of the mounting structure for the plurality of main terminals 40 shall be described referring to FIG. 2 to FIG. 4.

Figure 2:
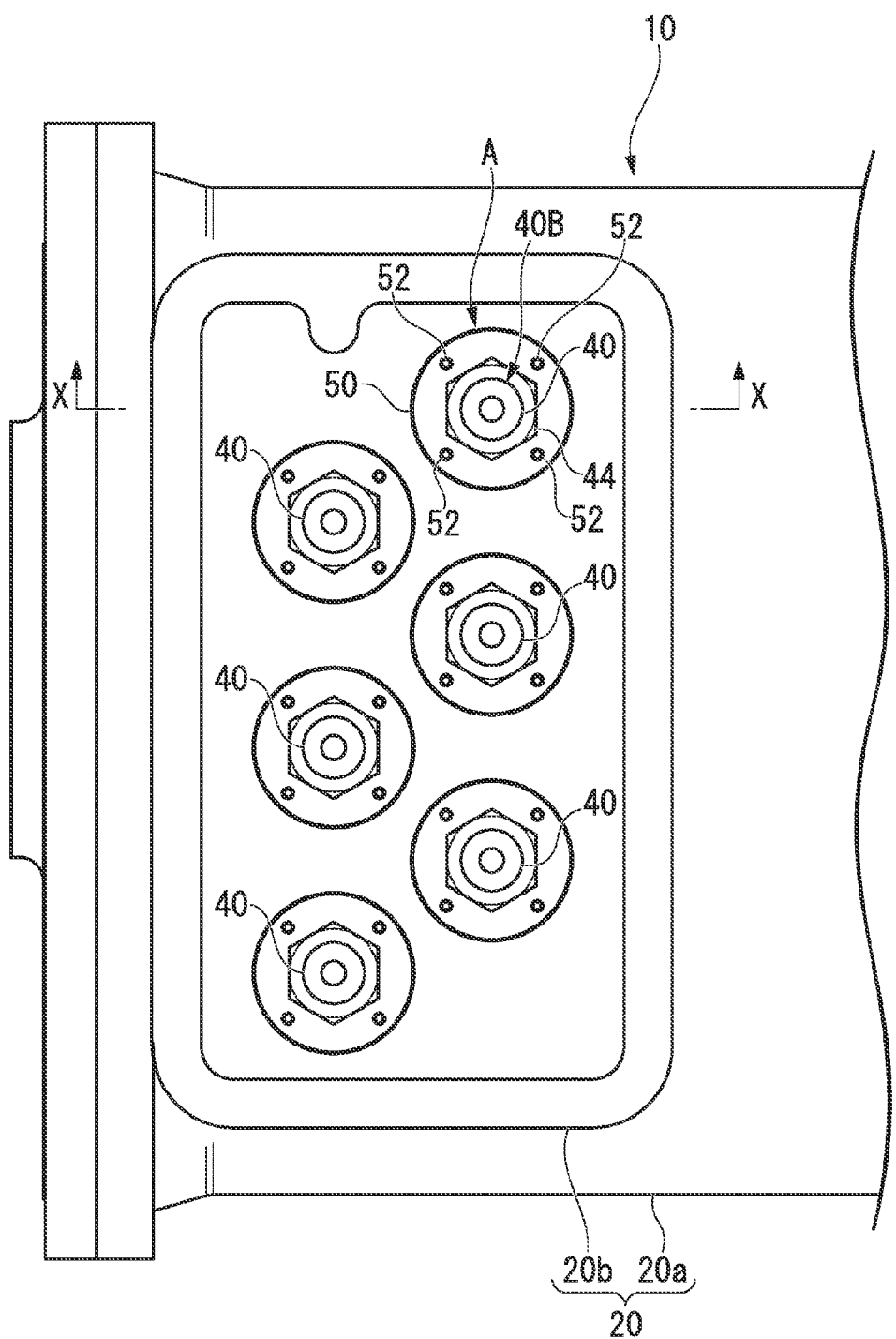
FIG. 2 is a plan view that shows the constitution of the mounting structure for a main terminal in the first embodiment of the present invention.

FIG. 2 is a plan view that shows the constitution of the mounting structure A for the main terminals 40 in the first embodiment of the present invention. FIG. 3 is a perspective view that shows the constitution of the mounting structure A of the main terminals 40 in the first embodiment of the present invention. FIG. 4 is a cross-sectional view along the arrows X-X in FIG. 2.

Figure 3:
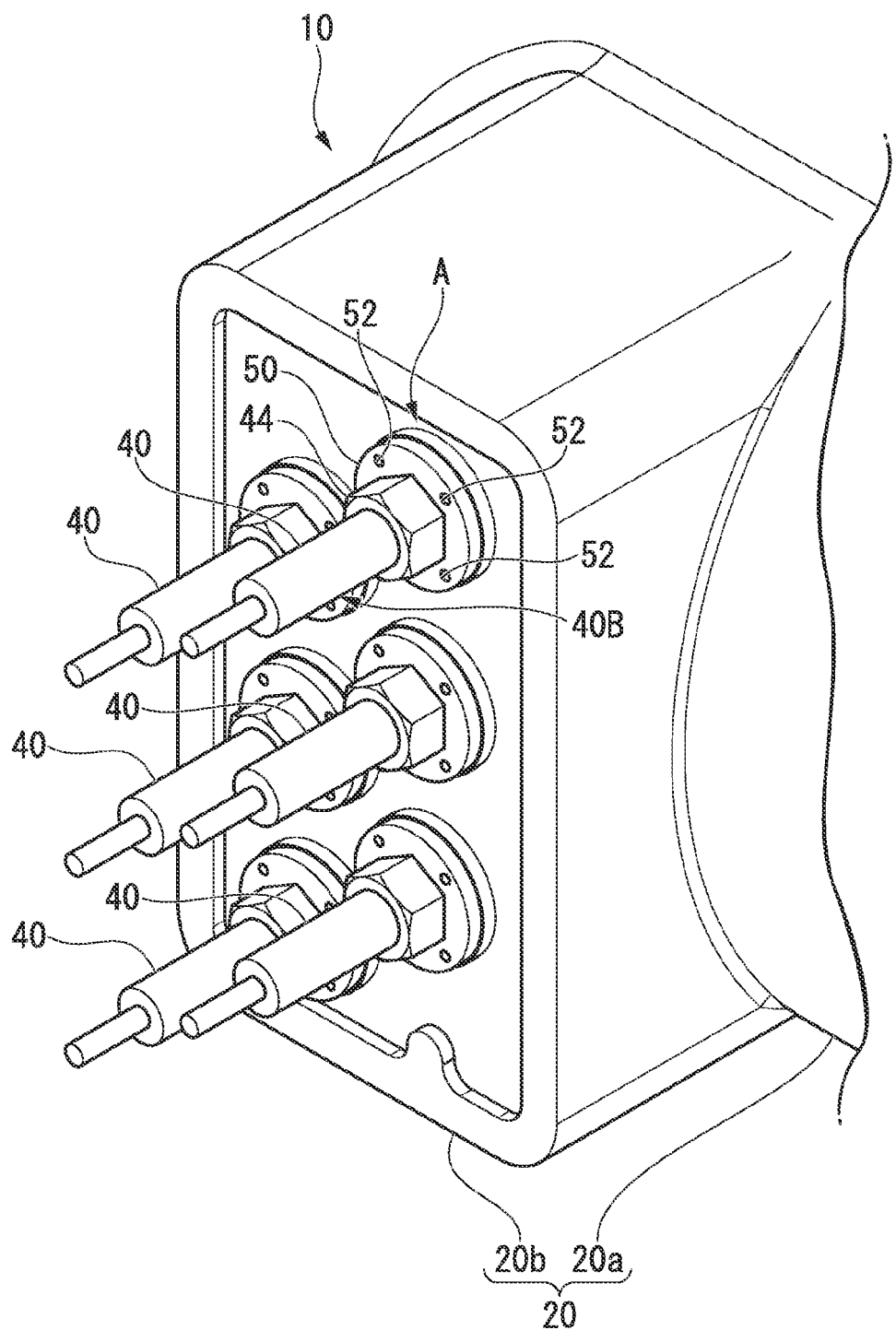
FIG. 3 is a perspective view that shows the constitution of the mounting structure for a main terminal in the first embodiment of the present invention.

A driving format that generates a rotating magnetic field by three-phase currents is adopted for the electric motor 10 of the present embodiment, and in correspondence with the three or a multiple thereof (six in the present embodiment) coils 38, as shown in FIG. 2 and FIG. 3, the same number of main terminals 40 (six in the present embodiment) are mounted to the housing 20.

As shown in FIG. 3, the housing 20 has a cylindrical main body portion 20a that houses the stator 22, the rotor 23 and the like, and a main terminal mounting portion 20b that projects outward from the main body portion 20a. The main terminal mounting portion 20b has a box shape that projects out in the radial direction of the main body portion 20a. The interior of the main terminal mounting portion 20b is hollow as shown in FIG. 4, and communicates with the interior of the main body portion 20a. The main terminal mounting portion 20b and the main body portion 20a are integrated, and formed by casting or the like.

The main terminals 40 are mounted to this main terminal mounting portion 20b in a staggered arrangement (refer to FIG. 2). As shown in FIG. 4, the main terminal 40 is mounted to the housing 20 in the state of one end portion 40A being inserted into the housing 20, and the other end portion 40B being exposed to the outside of the housing 20. The main terminal 40 is rod-shaped, and is mounted in a vertical orientation with respect to the main terminal mounting portion 20b of the housing 20 in the present embodiment. It is possible to affix a lead wire 39 that extends from the coil 38 to the one end portion 40A of the main terminal 40.

A crimp terminal 39a is attached to the distal end of the lead wire 39. The lead wire 39 attains electrical conduction with the one end portion 40A of the main terminal 40 via the crimp terminal 39a. A thread is cut on the one end portion 40A of the main terminal 40, and a nut 41 is screw mounted thereon. A hole, not illustrated, for allowing the one end portion 40A to pass through is formed in the crimp terminal 39a. For that reason, after passing the crimp terminal 39a over the one end portion 40A of the main terminal 40, one more nut 42 is attached, and the crimp terminal 39a is fastened between the nuts 41 and 42.

Note that in the case of releasing the fixation of the lead wire 39 at the one end portion 40A of the main terminal 40, the nut 42 is loosened and removed, and the crimp terminal 39a is pulled out from the one end portion 40A. In this way, at the one end portion 40A of the main terminal 40, it is possible to affix the lead wire 39 by the fastening state of the nut 42.

Figure 4:
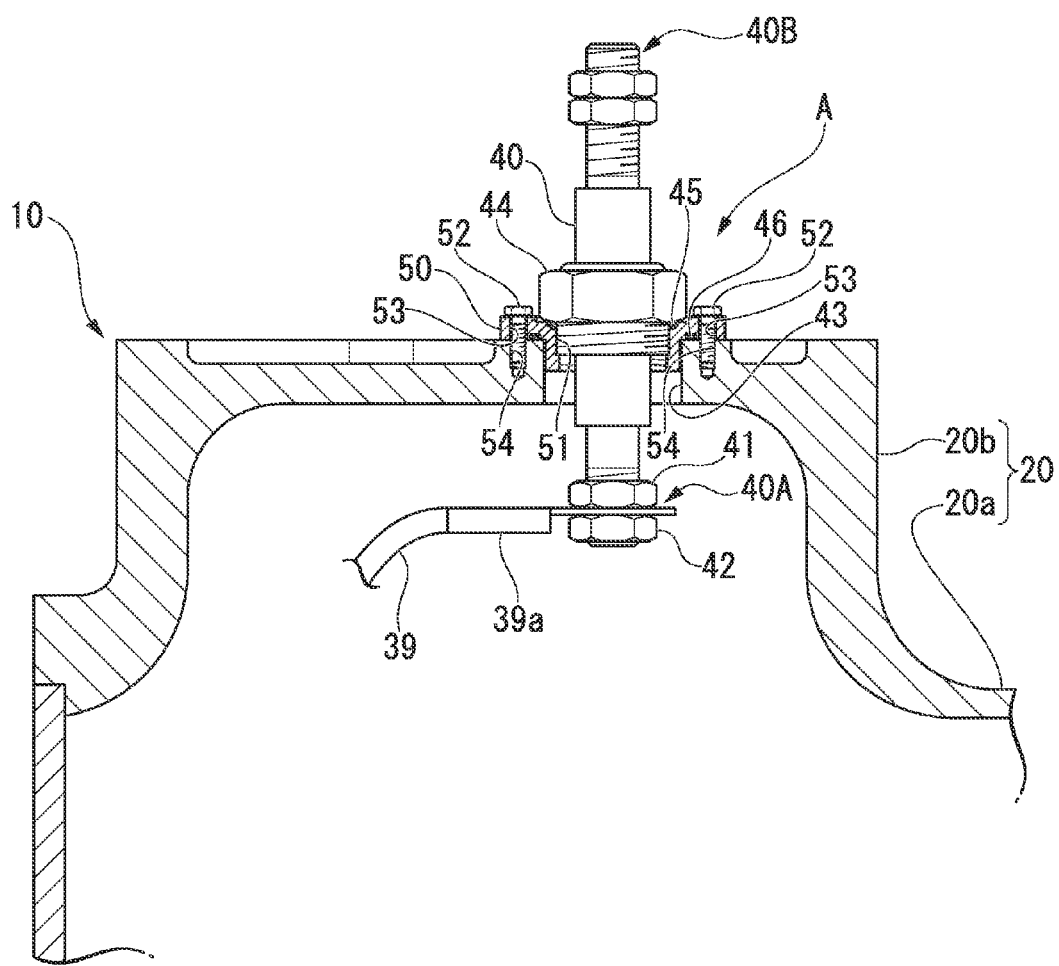
FIG. 4 is a cross-sectional view along the arrows X-X in FIG. 2.

As shown in FIG. 4, the housing 20 has a mounting hole 43 for mounting the main terminal 40. The mounting hole 43 is a circular hole that vertically passes through the main terminal mounting portion 20b of the housing 20.

The mounting hole 43 has a size for allowing insertion and removal of the one end portion 40A of the main terminal 40. The size of the mounting hole 43 of the present embodiment is at least greater than the nuts 41 and 42. It is possible to form this kind of mounting hole 43 by, for example, drilling a hole in the housing 20 with a drill. The lead wire 39 is housed in the interior of the housing 20 with slack for being pulled out along with the one end portion 40A of the main terminal 40 from the mounting hole 43. In this way, it is possible to pull out the lead wire 39 from the mounting hole 43 as is in the affixed state along with the one end portion 40A of the main terminal 40.

A flange portion 50 that is a small adapter is provided on the main terminal 40. The flange portion 50 is provided in the middle portion between the one end 40A and the other end 40B of the main terminal 40. The flange portion 50 is integrally affixed to the main terminal 40. As shown in FIG. 2 and FIG. 3, this flange portion 50 has a disk shape, and has a diameter that is larger than the main terminal 40. Also, this flange portion 50 has a diameter larger than the mounting hole 43 as shown in FIG. 4. For this reason, the flange portion 50 can block the gap that is formed between the main terminal 40 and the mounting hole 43.

Threads are cut at the middle portion of the main terminal 40, and a nut 44 is screw mounted thereon. The flange portion 50 has a screw hole 51 that can be screw mounted on the middle portion of the main terminal 40, and by fastening with the nut 44, it can be integrally affixed to the main terminal 40. A chamfering groove is formed on the fastening surface side of the flange portion 50, and a seal member 45 that seals the space between the flange portion 50 and the nut 44 is arranged. On the other hand, a circular groove is formed on the surface side opposite the fastening surface of the flange portion 50, and a seal member 46 that seals the space between the flange portion 50 and the housing 20 is arranged in the circular groove.

The flange portion 50 can be mounted around the mounting hole 43 from the outside of the housing 20 without involving rotation of the main terminal 40. The flange portion 50 can be attached to the housing 20 by fixing bolts (fixing member) 52. Each fixing bolt 52 is inserted in a through hole 53 provided in the outer diameter side of the flange portion 50, and screwed into a screw hole 54 provided in the main terminal mounting portion 20b of the housing 20. As shown in FIG. 2, the fixing by the fixing bolts 52 is performed at equal intervals in the circumferential direction of the flange portion 50. According to this type of constitution, it is possible to perform attachment and removal of the flange portion 50 from the outer portion of the housing 20 by the fixing bolts 52 without involving axial rotation of the main terminal 40.

Figure 5A:
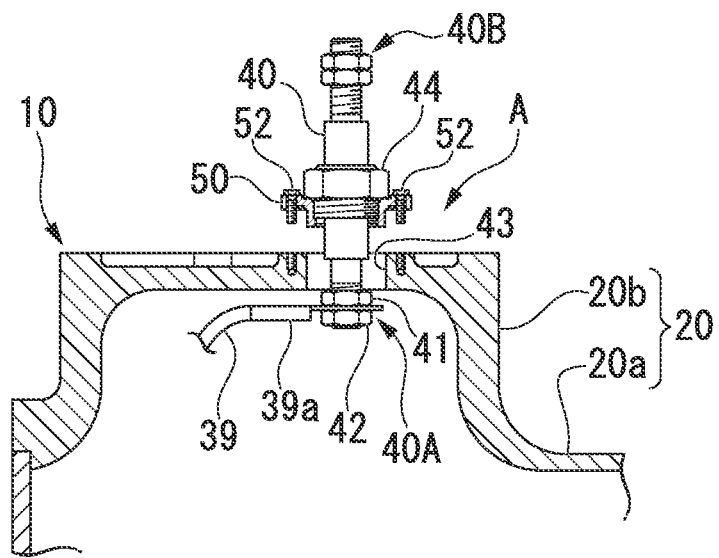
FIG. 5A is a drawing for describing the main terminal replacement operation in the first embodiment of the present invention.
Figure 5B:
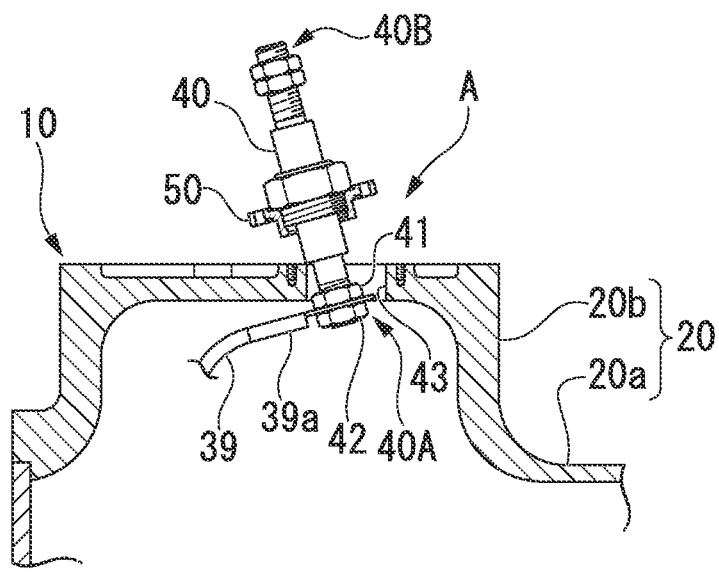
FIG. 5B is a drawing for describing the main terminal replacement operation in the first embodiment of the present invention.
Figure 5C:
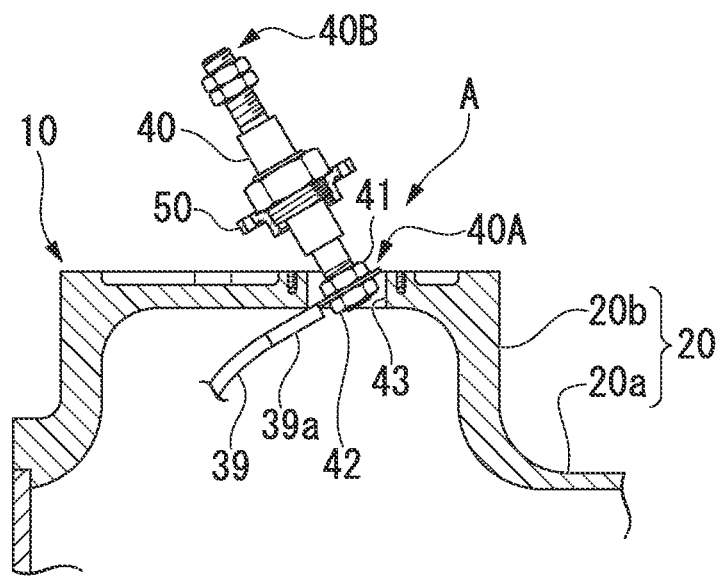
FIG. 5C is a drawing for describing the main terminal replacement operation in the first embodiment of the present invention.
Figure 5D:
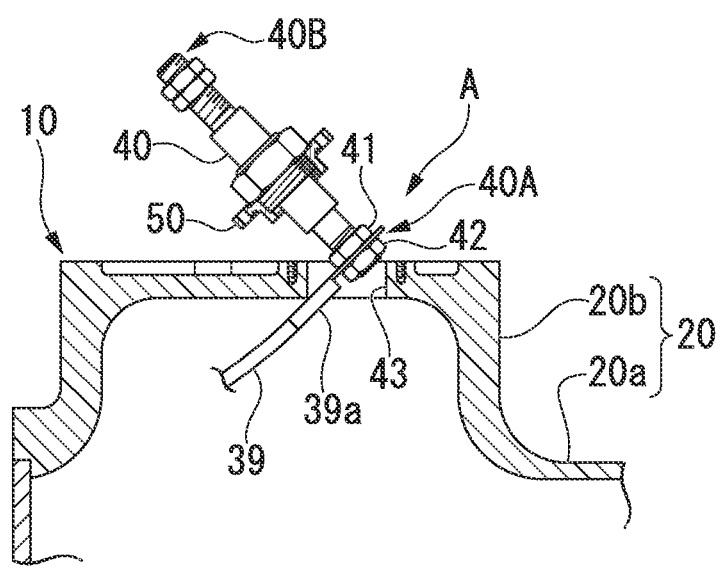
FIG. 5D is a drawing for describing the main terminal replacement operation in the first embodiment of the present invention.

Next, the action of the mounting structure A for the main terminal 40 having the constitution given above shall be described referring to FIG. 5A and FIG. 5D.

FIG. 5A to FIG. 5D are drawings for describing the replacement operation of the main terminal 40 in the first embodiment of the present invention.

In order to replace the main terminal 40, first, as shown in FIG. 5A, the fixation by the fixing bolts 52 is released. Since the fixing bolts 52 are exposed to the outside of the housing 20, it is possible to release the fixation by using a screwdriver. Also, since the fixing bolts 52 fix the flange portion 50 to the housing 20 as shown in FIG. 2, it is possible to perform the fixation and release without involving rotation of the main terminal 40. In this way, by providing the flange portion 50, the need to rotate the main terminal 40 during removal is eliminated, and it is possible to remove the main terminal 40 without twisting of the lead wire 39 that is affixed to the one end portion 40A in the housing 20.

Next, as shown in FIG. 5B, the main terminal 40 that is taken off is obliquely tilted. As shown in FIG. 5C, while further tilting the main terminal 40 and observing its state, the one end portion 40A to which the lead wire 39 is affixed is adjusted to an orientation so as to be able to pass through the mounting hole 43 that is provided in the housing 20. Since the crimp terminal 39a is provided on the lead wire 39, and a portion of the crimp terminal 39a projects in a direction perpendicular to the axial direction of the main terminal 40, by tilting this projection portion, it is possible to make it easily pass the mounting hole 43.

Afterward, as shown in FIG. 5D, the one end portion 40A to which the lead wire 39 is affixed is exposed to the outside of the housing 20 by raising the main terminal 40 while obliquely tilting it. Since the mounting hole 43 is formed to a size that allows insertion and removal of the one end portion 40A together with the lead wire 39, it is possible to pull out the one end portion 40A from the mounting hole 43 to the outside of the housing 20. Also, since the lead wire 39 is housed in the inside of the housing 20 with some slack, it is possible to pull out the one end portion 40A until a position at which it is visible and a position that facilitates work.

In this way, according to the present embodiment, it is possible to pull out the one end portion 40A of the main terminal 40 to which the lead wire 39 is affixed from the mounting hole 43 to the outside of the housing 20 by the easy work of just removing the flange portion 50. For that reason, it is possible to release the fixation of the lead wire 39 by loosening the nut 42 at a position that is visible and replace each main terminal 40 independently. Accordingly, as shown in FIG. 1, even for a large-sized electric motor 10 in which it is necessary to hold both ends of the rotation shaft 24 with the bearings 26 and 31, it is possible to replace only the main terminal 40 that is damaged without disassembling the entirety. For that reason, since it is possible to easily perform the replacement operation by manual work not requiring a crane, it is possible to substantially reduce the time and labor required for this replacement operation.

Accordingly, the first embodiment given above discloses the mounting structure A of the main terminal 40 for mounting the main terminal 40 in the housing 20 in the state of the one end portion 40A to which the lead wire 39 can be affixed being inserted in the housing 20 and the other end portion 40B being exposed to the outside of the housing 20. In the mounting structure A of the main terminal 40 in the first embodiment, the housing 20 has the mounting hole 43 for allowing insertion and removal of the one end portion 40A together with the lead wire 39, and moreover it is possible to independently and easily perform replacement of the main terminal 40 due to the main terminal 40 having the flange portion 50 that can mount the main terminal 40 about the mounting hole 43 from the outside of the housing 20 without involving rotation of the main terminal 40.

Second Embodiment

Next, the second embodiment of the present invention shall be described. In the following description, those portions that have the same or similar constitution as the first embodiment shall be given the same reference numerals, with descriptions thereof being abbreviated or eliminated.

Figure 6:
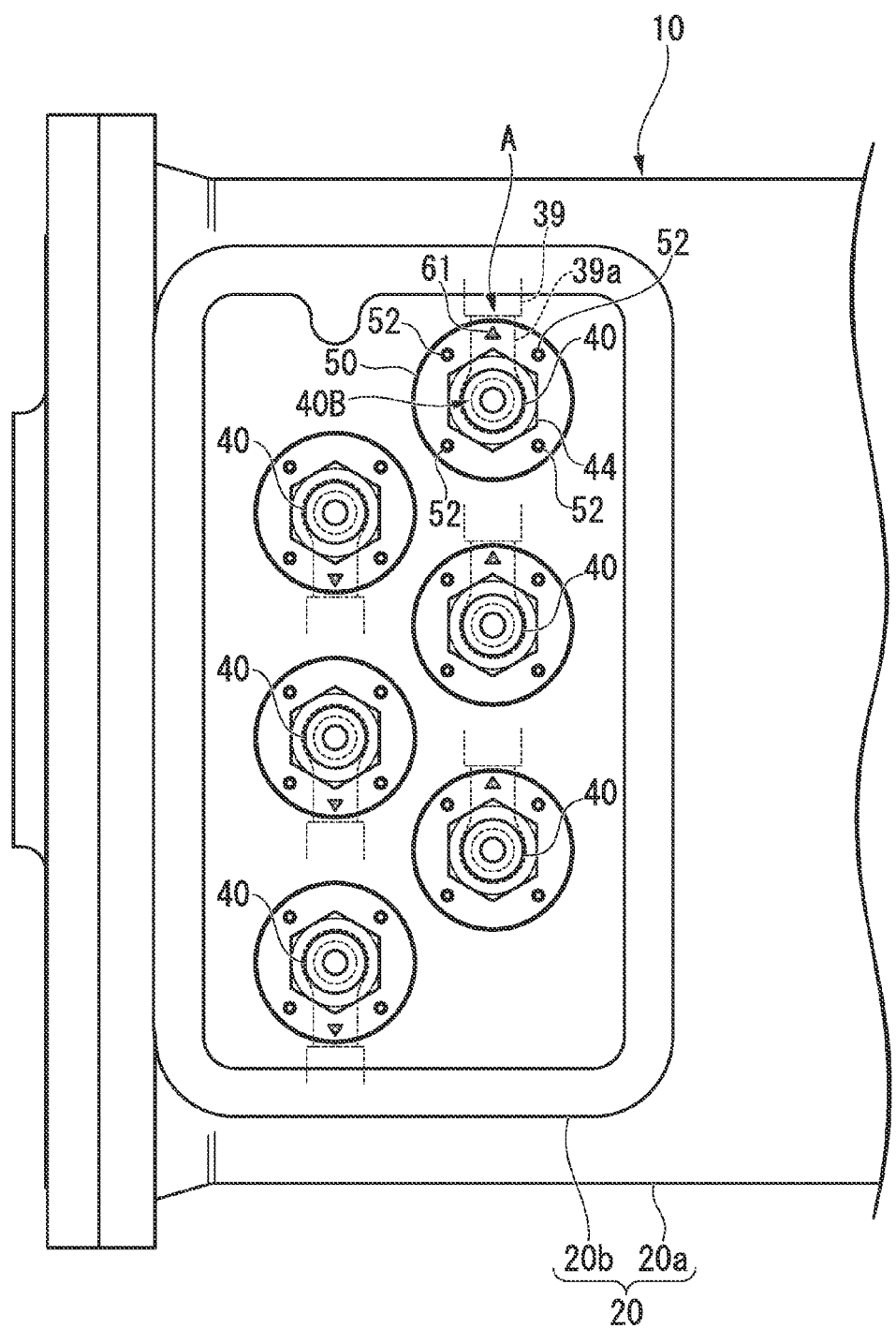
FIG. 6 is a plan view that shows the constitution of the mounting structure for a main terminal in the second embodiment of the present invention.

FIG. 6 is a plan view that shows the constitution of the mounting structure A for the main terminal 40 in the second embodiment of the present invention.

As shown in FIG. 6, the second embodiment differs from the aforementioned embodiment on the point of the mounting structure A of the main terminal 40 having an orientation adjusting member (mark 61).

The orientation adjusting member of the second embodiment has the mark 61 for adjusting the orientation of the main terminal 40 with respect to the mounting hole 43 to a predetermined orientation. Here, the predetermined orientation is an orientation in which the respective crimp terminals 39a of the lead wires 39 that are arranged in the housing 20 do not face each other, and an orientation in which it is possible to secure a sufficient insulation distance between terminals. The mark 61 is formed on the flange portion 50 corresponding to the orientation at which the lead wire 39 is affixed to the one end portion 40A. The mark 61 of the present embodiment is formed on the flange portion 50 so as to indicate the orientation in which the crimp terminal 39a of the lead wire 39 projects.

With the mounting structure A of the main terminal 40 of the second embodiment, the following action is obtained.

In the present embodiment, since the mark 61 is added corresponding to the orientation of the lead wire 39 to the flange portion 50 which is arranged on the outer portion of the housing 20 that is visible, it is possible to easily adjust the orientation based on the mark 61. By adjusting the orientation of the main terminal 40 with respect to the mounting hole 43 so as to be constant, it is possible to adjust to a specified orientation the orientation of the lead wire 39 that is affixed to the one end portion 40A of the main terminal 40 and arranged in the interior of the housing 20.

That is to say, according to the aforementioned mounting structure A, although it is possible to independently replace the main terminal 40 without disassembling the housing 20, the interior of the housing 20 during the replacement cannot be seen. For that reason, by providing the mark 61, it is possible to secure sufficient insulation distance of the lead wires 39 in the interior of the housing 20 that is not visible.

Third Embodiment

Next, the third embodiment of the present invention shall be described. In the following description, those portions that have the same or similar constitution as the first or second embodiment shall be given the same reference numerals, with descriptions thereof being abbreviated or eliminated.

Figure 7:
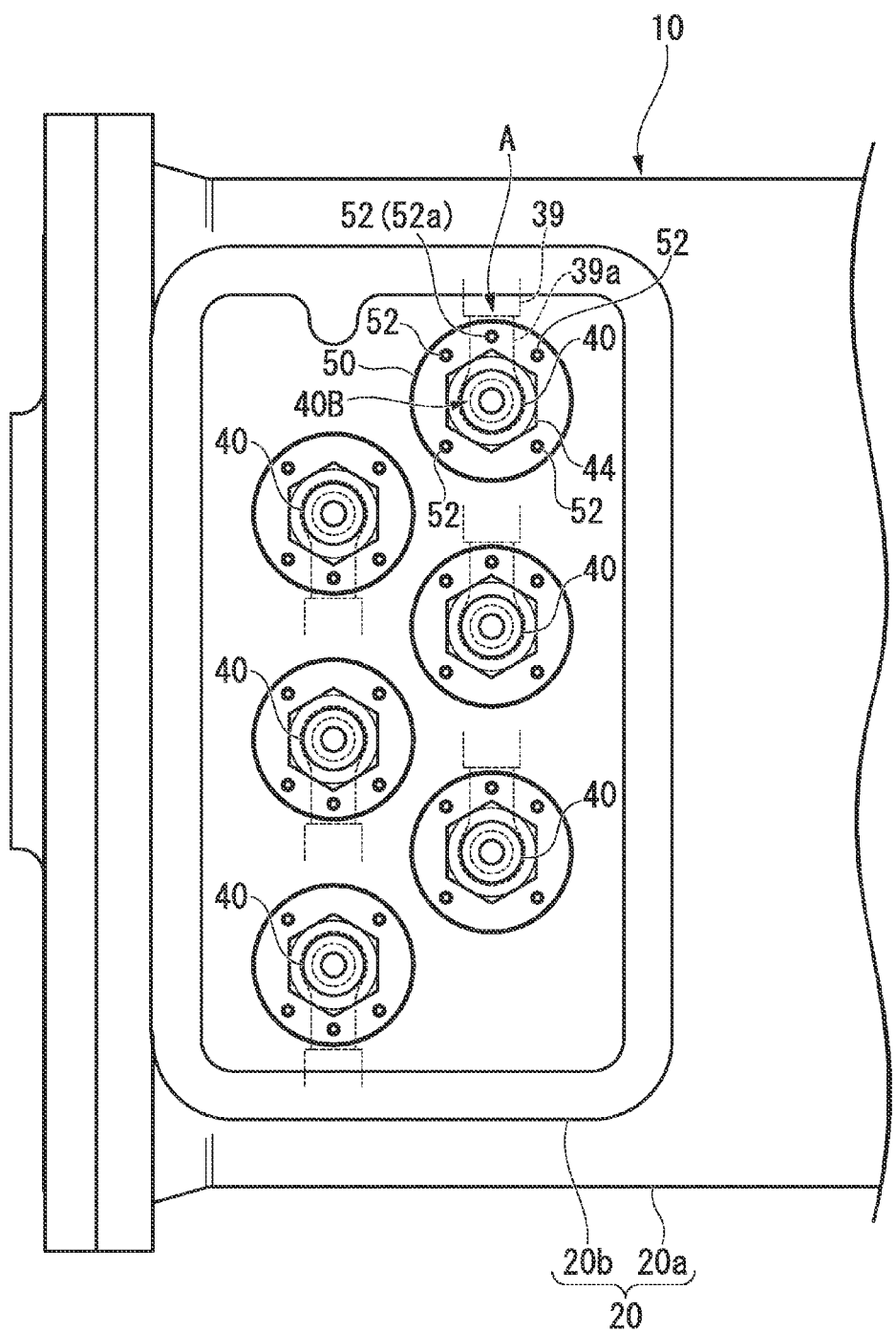
FIG. 7 is a plan view that shows the constitution of the mounting structure for a main terminal in the third embodiment of the present invention.

FIG. 7 is a plan view that shows the constitution of the mounting structure A for the main terminal 40 in the third embodiment of the present invention.

As shown in FIG. 7, the third embodiment differs from the aforementioned embodiments on the point of the mounting structure A of the main terminal 40 having an orientation adjusting member (fixing bolt 52 (52a)).

The orientation adjusting member of the third embodiment additionally has the fixing bolt 52a for adjusting the orientation of the main terminal 40 with respect to the mounting hole 43 to a predetermined orientation. By the addition of the fixing bolt 52a, the fixing bolts 52 (52a) are provided in a non-equal interval in the circumferential direction of the flange portion 50. Also, the fixing bolt 52a fixes the flange portion 50 at a position that indicates the orientation in which the crimp terminal 39a of the lead wire 39 projects, corresponding to the orientation in which the lead wire 39 is affixed to the one end portion 40A.

According to the mounting structure A of the main terminal 40 of the third embodiment with the constitution given above, the following action is obtained.

In the present embodiment, since the fixing bolt 52a can be affixed to the flange portion 50 which is arranged on the outer portion of the housing 20 that is visible, corresponding to the orientation of the lead wire 39, it is possible to easily adjust the orientation with the fixing bolt 52a serving as a mark. Also, since the fixing bolts 52 (52a) are provided in a non-equal interval in the circumferential direction of the flange portion 50, the flange portion 50 can be affixed to the housing 20 only in a specified orientation.

That is to say, according to the aforementioned mounting structure A, the mounting posture of the flange portion 50 is restricted to a certain posture. For that reason, it becomes impossible to affix it in another posture, and it is possible to adjust to a predetermined orientation the orientation of the lead wire 39 that is affixed to the one end portion 40A of the main terminal 40 and arranged in the housing 20, and it is possible to more reliably secure the insulation distance of the lead wires 39 in the interior of the housing 20 that is not visible.

Fourth Embodiment

Next, the fourth embodiment of the present invention shall be described. In the following description, those portions that have the same or similar constitution as the first, second, or third embodiments shall be given the same reference numerals, with descriptions thereof being abbreviated or eliminated.

Figure 8:
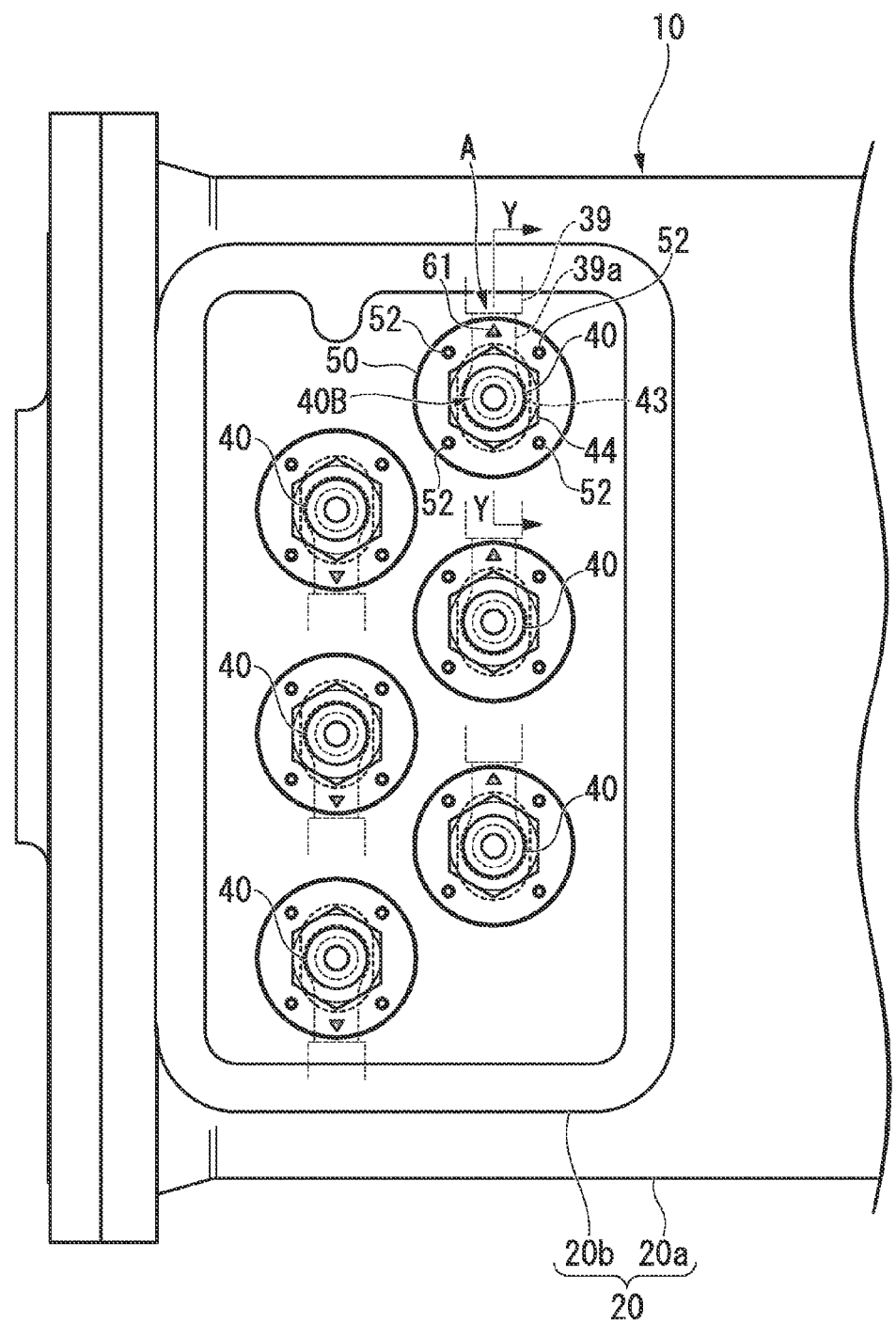
FIG. 8 is a plan view that shows the constitution of the mounting structure for a main terminal in the fourth embodiment of the present invention.
Figure 9:
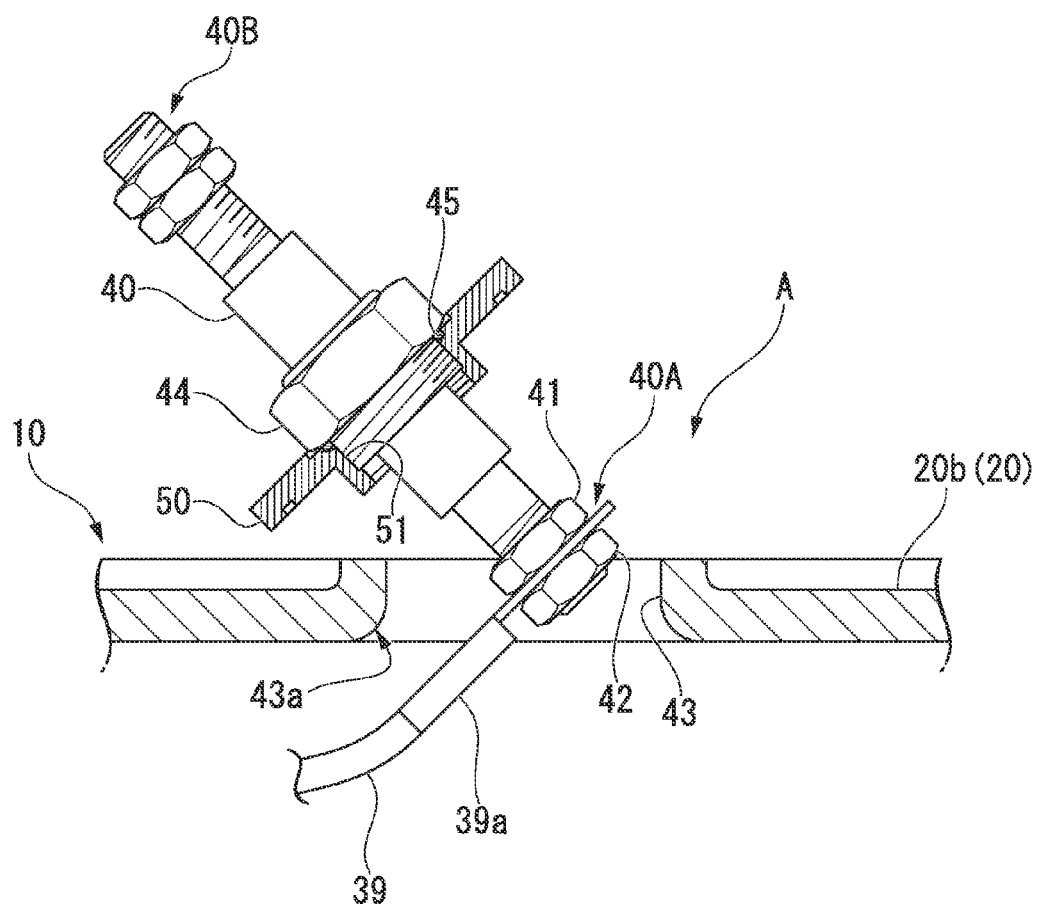
FIG. 9 is a cross-sectional view along the arrows Y-Y in FIG. 8 for describing the main terminal replacement operation.

FIG. 8 is a plan view that shows the constitution of the mounting structure A of the main terminal 40 in the fourth embodiment of the present invention. FIG. 9 is a drawing for describing the replacement operation of the main terminal 40 with a cross-sectional view along the arrows Y-Y in FIG. 8.

As shown in FIG. 8, the fourth embodiment differs from the embodiments given above on the point of the mounting hole 43 having an oblong shape.

As the mounting hole 43 of the fourth embodiment has an oblong shape, its size in the short-axis direction is greater than at least the width of the crimp terminal 39a of the lead wire 39. Also, the long-axis direction of the oblong shape of the mounting hole 43 matches the direction in which the crimp terminal 39a projects out in the mounted state. Also, in the mounting hole 43 of the fourth embodiment, an opening edge 43a at the interior of the housing 20 is chamfered and formed in a smooth curve shape, as shown in FIG. 9.

According to the mounting structure A of the main terminal 40 of the forth embodiment with the constitution given above, the following action is obtained.

In the present embodiment, since the mounting hole 43 has an oblong shape, as shown in FIG. 9, it is possible to easily tilt the main terminal 40 to which the lead wire 39 is attached and pull it out to the outside of the housing 20. Also, since the long-axis direction of the oblong shape of the mounting hole 43 matches the direction in which the crimp terminal 39a projects out, the lead wire 39 does not become twisted when tilted obliquely.

That is, according to the mounting structure A described above, since leeway in the gap is generated when pulling out the one end portion 40A, the lead wire 39 can smoothly pass the mounting hole 43 without getting caught on the opening edge 43a, and it is possible to easily pull out the one end portion 40A of the main terminal 40 to which the lead wire 39 is affixed from the mounting hole 43 to the outside of the housing 20.

Hereinabove, the preferred embodiments of the present invention were described while referring to the drawings, but the present invention is not limited to the aforementioned embodiments. The various shapes and combinations of each composite member shown in the embodiments described above refer to only a single example, and various modifications are possible based on design requirements and so forth within a scope that does not deviate from the subject matter of the present invention.

For example, in the aforementioned embodiments a mode of attaching the flange portion to the housing by fixing bolts is described, but the present invention is not limited to this mode. For example, it is possible to adopt a detachable constitution that does not involve rotation of the main terminal similarly to the aforementioned embodiments, even with a mode that attaches the flange portion to the housing by fitting.

Also, for example in the aforementioned embodiments, the modes of a mark and a fixing member with a non-equal interval arrangement are described as orientation adjusting member, but the present invention is not limited to these modes, and it may also be a mode that adjusts the orientation of the connection terminal with respect to the mounting hole to a predetermined orientation by providing a positioning pin or the like.

Also, for example, in the aforementioned embodiments, a mode is described of applying the present invention to the mounting structure for a main terminal, but the present invention is not limited to this mode, and it can also be applied to a mounting structure for a sub-terminal or a mounting structure for another connection terminal.

INDUSTRIAL APPLICABILITY

With the mounting structure for a connection terminal of the present invention, and a turbo compressor and turbo refrigerator provided with the mounting structure for a connection terminal, it is possible to easily perform replacement of the connection terminal.

DESCRIPTION OF THE REFERENCE SYMBOLS

1: Turbo refrigerator
2: Condenser
4: Evaporator
5: Turbo compressor
10: Electric motor
13, 14: Impeller
20: Housing
39: Lead wire
40: Main terminal (connection terminal)
40A: One end portion
40B: Other end portion
43: Mounting hole
50: Flange portion
52, 52a: Fixing bolt (fixing member, orientation adjusting member)
61: Mark (orientation adjusting member)

The invention claimed is:
1. A turbo compressor that compresses a gas by rotating an impeller with an electric motor,
the compressor comprising:
a housing accommodating the electric motor; and
a plurality of connection terminals mounted to the housing, each of the plurality of connection terminals having a first end portion arranged inside of the housing, and a second end portion arranged outside of the housing, wherein
a lead wire of the electric motor can be affixed to the first end portion,
the housing has a plurality of mounting holes, each of the plurality of connection terminals passing through a respective one of the plurality of mounting holes,
each of the plurality of mounting holes is formed to a size that allows insertion and removal of the first end portion together with the lead wire,
each of the plurality of connection terminals has a respective flange portion that surrounds a respective one of the plurality of mounting holes, and
each of the respective flange portions can be mounted to the housing from outside of the housing, without involving rotation of the connection terminal.

2. A turbo refrigerator comprising:
a condenser that liquefies a compressed refrigerant;
an evaporator that cools a cooling object by evaporating the refrigerant that is liquefied by the condenser; and
a turbo compressor that compresses the refrigerant that is evaporated by the evaporator and supplies it to the condenser, wherein
the turbo compressor is the turbo compressor according to claim 1.

3. The turbo compressor according to claim 1, further comprising an orientation adjusting member that adjusts the orientation of the connection terminal with respect to the mounting hole to a predetermined orientation.

4. The turbo compressor according to claim 3, wherein the orientation adjusting member has a mark that is formed on the flange portion corresponding to the orientation in which the lead wire is affixed to the first end portion.

5. The turbo compressor according to claim 1, wherein
the flange portion can be attached to the housing by fixing members, and
the fixing members are provided in a non-equal interval in the circumferential direction of the flange portion.

6. The turbo compressor according to claim 1, wherein
the lead wire has a crimp terminal that is mounted to the connection terminal,
a portion of the crimp terminal projects from the connection terminal in the mounted state, and
the flange portion has a mark that is formed corresponding to a direction in which the crimp terminal projects.

7. The turbo compressor according to claim 1, wherein each of the mounting holes has an oblong shape.

8. The turbo compressor according to claim 7, wherein
the lead wire has a crimp terminal that is mounted to the connection terminal,
a portion of the crimp terminal projects from the connection terminal in the mounted state, and
a long-axis direction of the mounting hole matches a direction in which the crimp terminal projects.

9. The turbo compressor according to claim 8, wherein the flange portion has a mark that is formed corresponding to the direction in which the crimp terminal projects.

* * * * *